US009112589B2

(12) United States Patent
Uhl

(10) Patent No.: US 9,112,589 B2
(45) Date of Patent: Aug. 18, 2015

(54) ADAPTIVE MODE OPTIMIZER AND MODE SHIFTER

(71) Applicant: INVERTIX CORPORATION, McLean, VA (US)

(72) Inventor: Brecken H. Uhl, La Mesa, NM (US)

(73) Assignee: INVERTIX CORPORATION, McLean, VA (US)

( * ) Notice: Subject to any disclaimer, the term of this patent is extended or adjusted under 35 U.S.C. 154(b) by 180 days.

(21) Appl. No.: 13/777,610

(22) Filed: Feb. 26, 2013

(65) Prior Publication Data

US 2014/0242924 A1 Aug. 28, 2014

(51) Int. Cl.

| | |
|---|---|
| ***H04B 7/02*** | (2006.01) |
| ***H04B 1/525*** | (2015.01) |
| ***H04B 1/00*** | (2006.01) |

(52) U.S. Cl.

CPC .............. *H04B 1/525* (2013.01); *H04B 1/0064* (2013.01)

(58) Field of Classification Search

USPC .......... 455/79, 214, 78, 313, 101, 553.1, 123, 455/275, 276.1, 126, 24, 67.14, 41.3, 83, 455/448; 375/211, 214, 259, 299, 347, 267, 375/233, 147; 370/315, 279, 335, 342, 350, 370/411, 332, 330, 252

See application file for complete search history.

(56) References Cited

U.S. PATENT DOCUMENTS

| | | | | |
|---|---|---|---|---|
| 5,946,621 | A * | 8/1999 | Chheda et al. | 455/440 |
| 8,649,418 | B1 * | 2/2014 | Negus et al. | 375/211 |
| 8,824,976 | B2 * | 9/2014 | See | 455/78 |
| 2006/0215592 | A1 * | 9/2006 | Tomoe et al. | 370/315 |
| 2008/0225929 | A1 * | 9/2008 | Proctor et al. | 375/214 |
| 2009/0289861 | A1 * | 11/2009 | Tang et al. | 343/722 |
| 2010/0080151 | A1 * | 4/2010 | Proctor et al. | 370/279 |

* cited by examiner

*Primary Examiner* — Ganiyu A Hanidu

(74) *Attorney, Agent, or Firm* — The Marbury Law Group, PLLC

(57) ABSTRACT

A mode shifter connects via an input port to an antenna port of a transceiver. A port signal analyzer monitors the signal at the input port and informs a signal switch whether the signal power exceeds a threshold value. When the signal power does not exceed the threshold value, the signal switch connects the input port (and consequently the antenna port of the transceiver) to a receive path comprising a receive signal processor, an antenna selection processor, and an antenna port. When the signal exceeds the threshold value, the signal switch connects the input port (and consequently the antenna port of the transceiver) to a transmit path comprising a transmit signal processor, the antenna selection processor, and an antenna port.

16 Claims, 4 Drawing Sheets

ADAPTIVE MODE OPTIMIZER AND MODE SHIFTER

BACKGROUND

Wireless communications systems provide both voice and data communications using a variety of popular protocols in a variety of established frequency bands.

However, fixed frequency band systems may not be suitable for every environment. For example, high frequency signals may be advantageous for use in open terrain but not in underground tunnels. In large population centers, assigned bands may be crowded and subject to interference. Additionally, a fixed frequency band device may not be compliant with regulations in all jurisdictions. These constraints may require users to acquire multiple systems or to purchase more expensive systems (e.g., systems with additional power) in order to satisfy site requirements and/or regulatory requirements.

SUMMARY

Embodiments herein are directed to a frequency band conversion circuit that connects to the antenna port of a transceiver to shift the native center frequency of the transceiver to a different center frequency without modification of the transceiver. The frequency band conversion circuit also allows for use of different antennas and/or antenna routing to take advantage of different frequency propagation characteristics afforded by different frequency bands in conjunction with different antenna shapes and formats.

DETAILED DESCRIPTION

Embodiments herein are directed to a frequency band conversion circuit that connects to the antenna port of a transceiver to shift the native center frequency of the transceiver to a different center frequency without modification of the transceiver. The frequency band conversion circuit also allows for use of different antennas and/or antenna routing to take advantage of different frequency propagation characteristics afforded by different frequency bands in conjunction with different antenna shapes and formats.

Figure 1:
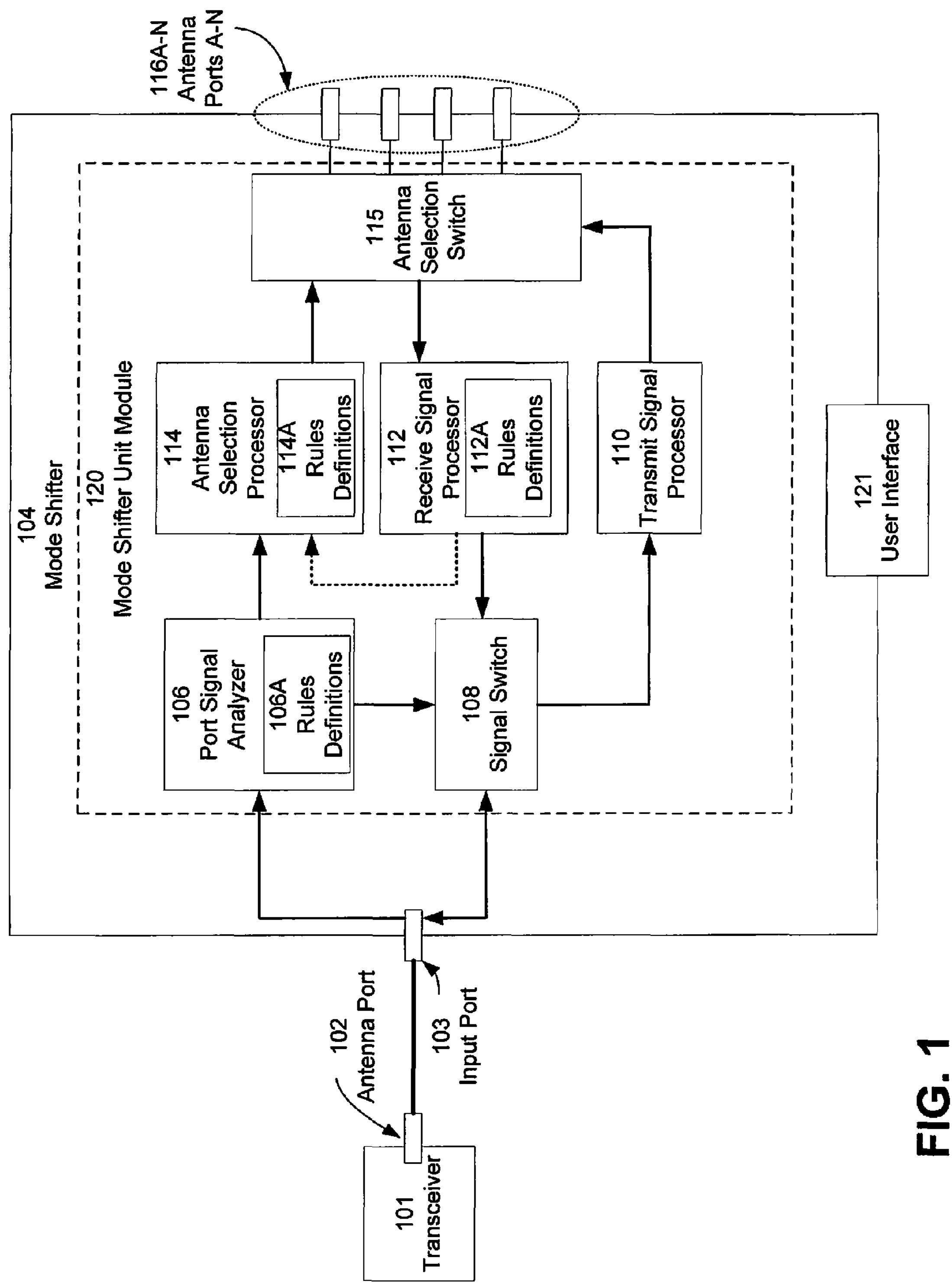
FIG. 1 is a block diagram illustrating elements of a mode shifter according to an embodiment.

FIG. 1 is a block diagram illustrating elements of a mode shifter (MS) according to an embodiment.

A mode shifter 104 connects via an input port 103 to an antenna port 102 of a transceiver 101. In an embodiment, the transceiver 101 may be an off the shelf device or a custom device. Regardless of whether the transceiver 101 is off the shelf or custom built, no modifications are required to connect the transceiver 101 to the mode shifter 104.

A port signal analyzer 106 monitors the signal at the input port 103 for one or more signal characteristics. In an embodiment, the signal characteristics identified by the port signal analyzer 106 are determined by reference to one or more rules stored in a memory 106A. The rules definitions stored in the memory 106A may be configured via a user interface 121 as more fully described below.

In one embodiment, the port signal analyzer 106 informs a signal switch 108 whether the signal power exceeds a threshold value. When the signal power does not exceed the threshold value, the signal switch connects the input port 103 (and consequently the antenna port 102) to a receive path comprising a receive signal processor 112 and an antenna selection switch 115. When the signal exceeds the threshold value, the signal switch 108 connects the input port 103 (and consequently the antenna port 102) to a transmit path comprising a transmit signal processor 110 and the antenna selection switch 115.

The antenna selection processor 114 uses the signal characteristics provided by the port signal analyzer 106 value to issue one or more commands to the antenna selection switch 115 to select an appropriate transmit or receive antenna from one of N antennas 116A-N. In an embodiment, the commands issued to the antenna selection switch 115 are generated by the antenna selection processor 114 in accordance with one or more rules stored in a memory 114A. The rules definitions stored in the memory 114A may be configured via a user interface 121 as more fully described below.

In an embodiment, the receive signal processor 112 may identify characteristics of the received signal and may instruct the antenna selection processor to select a different one of the N antennas 116A-N to receive an incoming signal. For example, the receive signal processor 112 may determine a signal quality, a signal polarization, a signal amplitude, a level of interference or noise in the received signal among other characteristics. In an embodiment, the command issued to the antenna selection switch 115 by the receive signal processor 112 is generated by the receive signal processor 112 in accordance with one or more rules stored in a memory 112A. The rules definitions stored in the memory 112A may be configured via a user interface 121 as more fully described below.

In yet another embodiment, the antenna selection processor 114 may use the signal characteristics of the received signal to issue a command to the antenna selection switch 115 to select two or more of the N antennas 116A-N to receive the incoming signal. In an embodiment, the command issued to the antenna selection switch 115 to select two or more of the N antennas 116A-N may be generated by the antenna selection processor 114 in accordance with one or more rules stored in the memory 114A using the signal characteristics of the received signal provided by the receive signal processor 112. The signal characteristics identified by the receive signal processor 112 may be selected in accordance with one or more rules stored in a memory 112A. The rules definitions stored in the memory 112A and the memory 114A may be configured via a user interface 121 as more fully described below.

In still another embodiment, the port signal analyzer 106 may identify characteristics of the transmitted signal present on the input port 103, which characteristics may be used by the antenna selection processor 114 to issue commands to the antenna selection switch 115 to select two or more of the N antennas 116A-N to transmit the outbound signal. In an embodiment, the command issued to the antenna selection switch 115 to select two or more of the N antennas 116A-N may be generated by the antenna selection processor 114 in accordance with one or more rules stored in the memory 114A using the signal characteristics of the transmitted signal present on the input port 103. The signal characteristics identified by the port signal analyzer may be selected in accordance with one or more rules stored in a memory 106A. The rules definitions stored in the memory 106A and the memory 114A may be configured via a user interface 121 as more fully described below.

In an embodiment, a user interface 121 allows a user to configure the rules databases 106A, 114A and 112A to allow the port signal analyzer 106, the antenna selection processor 114 and the receive signal processor 112 to make decisions. In an embodiment, the rule definitions are pre-defined in memories 106A, 112A and 114A. The selection of a particular rule may be made in various ways. For example, the interface 121 may be implemented as a set of dip switches in which the position of one or more switches is associated with a particular rule definition. Alternatively, the user interface may be implemented as a physical USB port or a physical LAN port that connects to an on-board web server. The web server produces web pages that may be displayed on a computing device and that allow a user to select rules elements from a drop-down menu. In yet another implementation, the rule definitions may be maintained on an external database that is accessible to the user interface 121 via a network. The rules definitions may be pre-defined or may be user defined as is known in the art.

Figure 2:
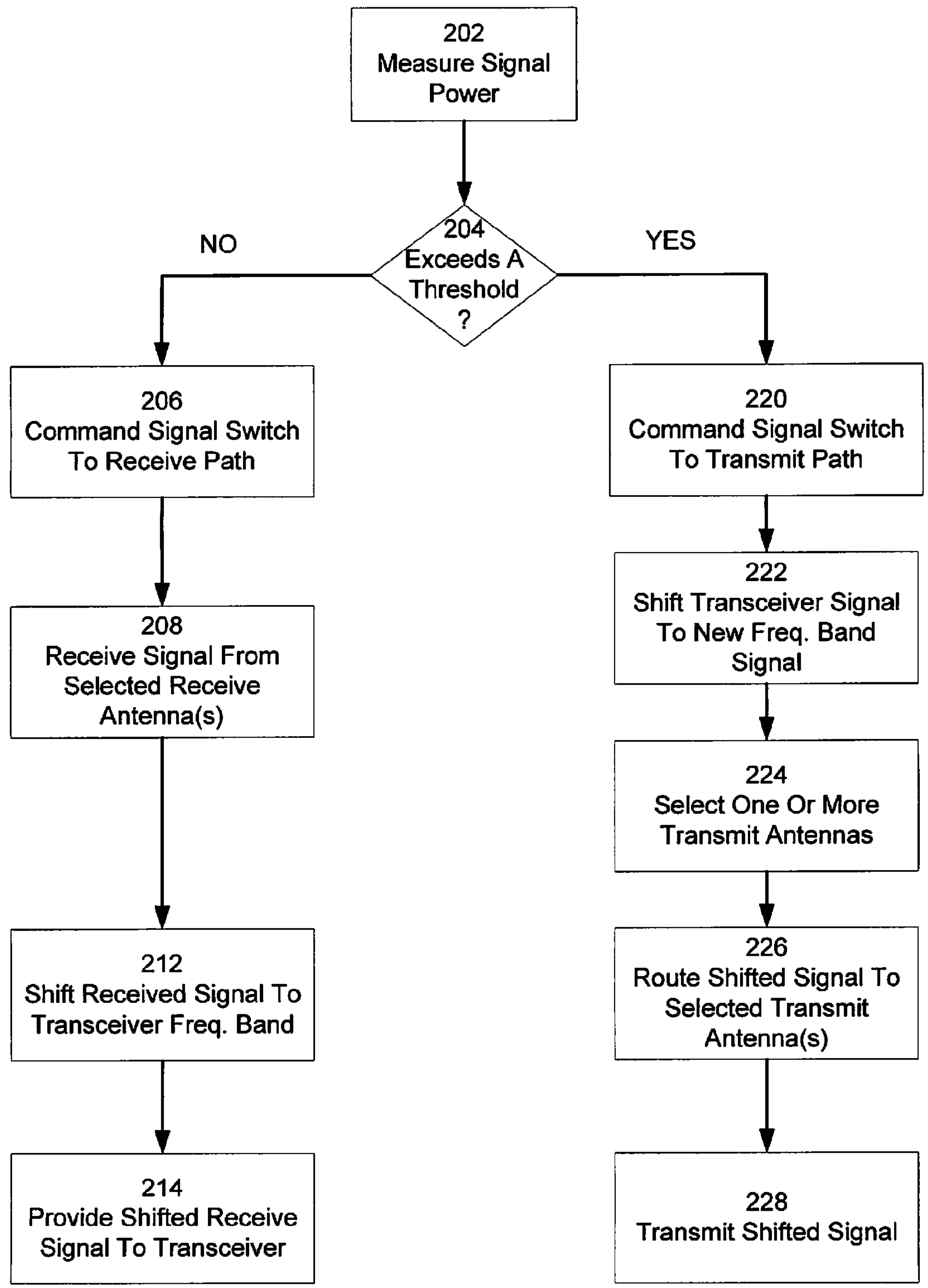
FIG. 2 is a flow diagram illustrating an operational flow of the mode shifter according an embodiment.

FIG. 2 is a flow diagram illustrating an operational flow of the mode shifter according to an embodiment. In an embodiment, the mode shifter 104 measures signal power from a transceiver 101 to which it is connected via the transceiver antenna port (Block 202). A determination is made as to whether the signal power exceeds a threshold (Block 204).

If the signal power does not exceed a threshold, that is, the result of Block 204 is "NO," a command is sent to a signal switch to connect the input port of the mode shifter 104 to a receive path (Block 206). A signal corresponding to the frequency band of the mode shifter 104 is received from a selected receive antenna (Block 208). A receive signal processor shifts the received signal to the native frequency band of the transceiver (Block 212). The received signal as shifted is then provided to the transceiver 101 (Block 204). Note that from the perspective of the transceiver 101, the signal that it receives has not been processed.

If the signal power exceeds a threshold, that is, the result of Block 204 is "YES," a command is sent to a signal switch to connect the input port of the mode shifter 104 to a transmit path (Block 220). A signal is received from the transceiver 101 and is shifted from the native frequency band of the transceiver to a new frequency band (Block 222). The new frequency band may be either higher or lower than the native frequency band of the transceiver 101. One or more antennas for transmitting the shifted signal are selected (Block 224). The shifted signal is routed to the selected one or more antennas (Block 226) and transmitted (Block 228).

Figure 3:
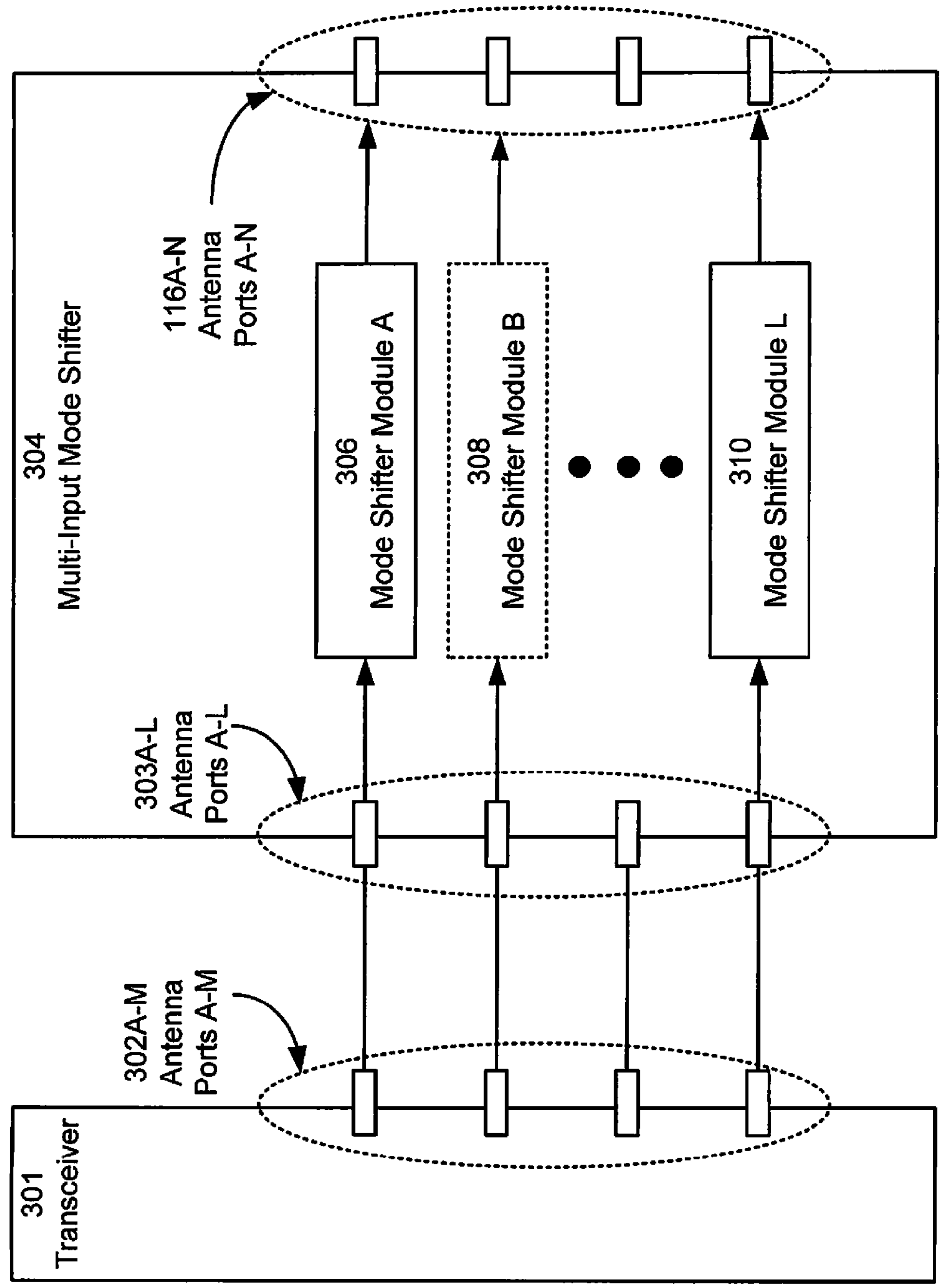
FIG. 3 is a block diagram illustrating elements of a mode shifter having multiple inputs according to an embodiment.

FIG. 3 is a block diagram illustrating elements of a mode shifter having multiple inputs according to an embodiment.

Referring to FIG. 1, a mode shifter unit module 120 comprises port signal analyzer 106, a signal switch 108, a transmit signal processor 110, a receive signal processor 112, an antenna selection processor 114 and an antenna selection switch 115. Referring to FIG. 3, a multi-input mode shifter 304 comprises A-L mode shifter modules (306, 308 and 310) that each correspond to a mode shifter unit module 120 as illustrated in FIG. 1. A transceiver 301 comprises A-M antenna ports 302. The multi-input mode shifter 304 has one antenna port 303 for each of the A-L mode shifter modules. Any one of the mode shifter modules A-L may be connected to one or more of the A-N antenna ports 116 via the module's antenna selection switch 115.

Figure 4:
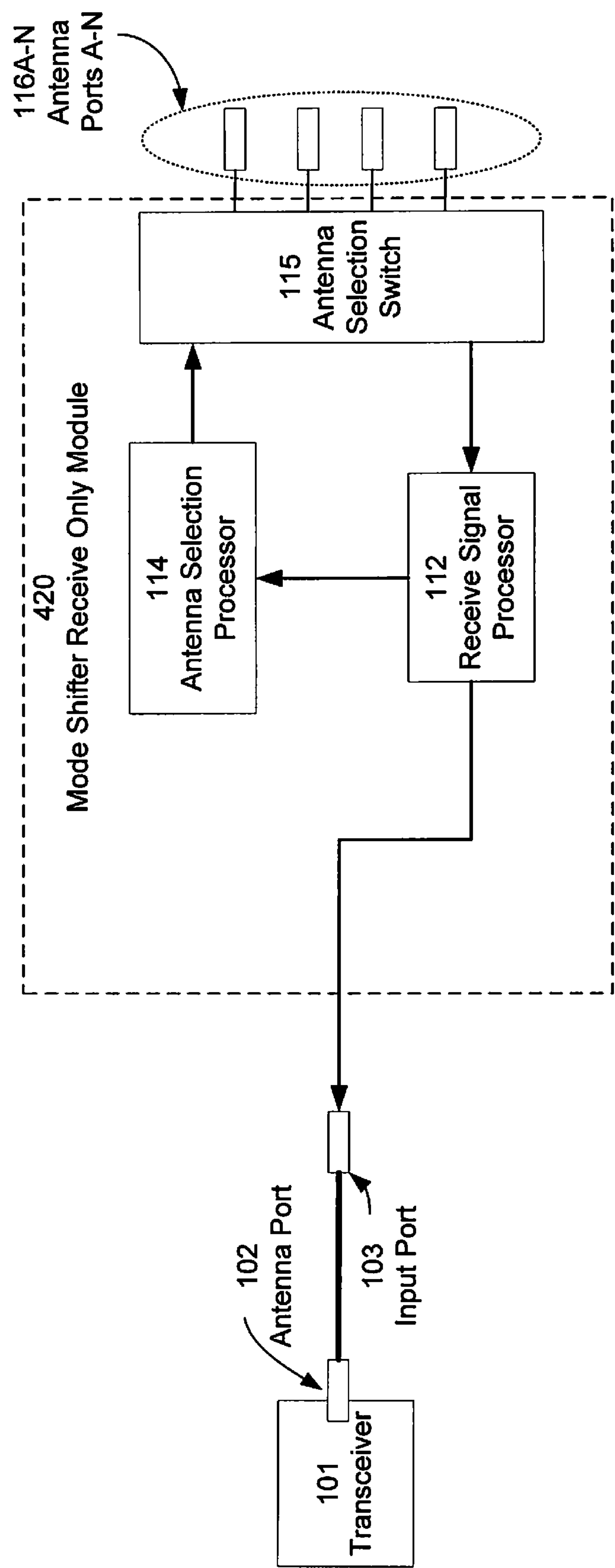
FIG. 4 is a block diagram illustrating elements of a mode shifter receive only module according to an embodiment.

FIG. 4 is a block diagram illustrating elements of a mode shifter receive only module according to an embodiment.

Referring to FIG. 1, a mode shifter receive only module 420 comprises a receive signal processor 112, an antenna selection processor 114 and an antenna selection switch 115. Referring to FIG. 4, the receive signal processor 112 evaluates signals selected from any one of the antenna ports A-N 116 by the receive module's antenna selection switch 115. The antenna selection switch 115 may be controlled by the antenna selection processor 114. In an embodiment, the antenna selection processor 114 is responsive to commands provided by a user of the mode shifter receive only module to issue commands to the antenna selection switch 115 to select signals from one or more of the A-N antenna ports 116. For example, the antenna selection processor 114 may be configured via a graphical user interface (not illustrated) to select a particular antenna port from the A-N ports or it may be configured to select an antenna based on receive signal characteristics provided by the receive signal processor 112. The antenna selection processor may also be configured to optimize one or more characteristics of the received signal by selecting one or more antennas according to a select algorithm.

In an embodiment, a mode shifter 104 may be configured to shift any signal at least between 10 MHz to 8 GHz to at least the 30 MHz to 2.2 GHz band. Lower frequencies are often much better for signal transmission in challenging environments, and the mode shifter allows for the immediate re-use of existing COTS/GOTS at optimized frequencies and with optimized antenna configurations.

In another embodiment, an adaptive mode optimizer (AMO) senses channel conditions and selects (optimizes) the best combination of operating frequency and antenna configuration. This "hypervisor" capability builds on the mode shifter core to achieve true spectrum agility, not just in frequency, but also antenna pattern/polarization/impedance (wave mode).

The mode shifter 104, even without the fully-automated AMO capability, may be used to support a variety of valuable hypervisor applications. A simple example would be a congested portion of the spectrum, where there are too many users operating at the same time. A sub-set of the users could be augmented with a mode shifter to move them to a less-used nearby band (which is not accessible to the fixed-band COTS/GOTS device). This augmentation requires only that the mode shifter be given a source of DC power and is connected between each fixed-band device's existing antenna port and the same or a band-shifted antenna.

Other examples pertain to challenging propagation environments. Again, even without the automated benefits of the full AMO concept, the mode shifter 104 operated in a fixed-channel mode can easily shift an existing complex modulation format such as full-motion video operating through a fixed-band COTS transceiver at a sub-optimal frequency band to a much more effective channel far outside the range available to the fixed-band device. For applications such as underground communications, it is known that lower-frequency signals travel much more effectively, especially around bends and corners in the tunnel or mine.

It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the," is not to be construed as limiting the element to the singular. Words such as “thereafter,” “then,” “next,” etc. are not intended to limit the order of the blocks; these words are simply used to guide the reader through the description of the methods.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA), or other programmable logic device, discrete gate or transistor logic, discrete hardware components, or any combination thereof as appropriate to perform the functions described herein.

A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The blocks of a method or algorithm disclosed herein may be embodied in a processor-executable software module, which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the following claims and the principles and novel features disclosed herein.

What is claimed is:

1. A mode shifter circuit connectable to an external radio frequency (RF) transceiver for frequency band conversion, the circuit comprising:

an input port configured to receive a radio frequency (RF) signal from an antenna port of the external radio frequency (RF) transceiver;

a signal switch;

a port signal analyzer configured to perform operations comprising:

determining whether a power measurement at the input port exceeds a threshold; and issuing a transmit command signal to the signal switch to connect the input port to a transmit path when the power measurement exceeds the threshold;

a transmit signal processor configured to perform operations comprising:

shifting the RF signal to a shifted signal band, wherein the shifted signal band is lower or higher that a native radio frequency band of the external transceiver; and communicating the shifted RF signal to at least one antenna of a plurality of antennas for transmission, wherein the transmit signal processor is included in the transmit path, wherein the plurality of antennas is configured to form a phased array; and an antenna selection processor configured to perform operations comprising:

determining and assigning a weight function to each of the plurality of antennas.

2. The circuit of claim 1, further comprising:

an antenna selection switch, wherein:

the port signal analyzer is further configured to perform operations comprising:

determining at least one signal characteristic of the RF signal;

communicating the at least one signal characteristic to an antenna selection processor;

the antenna selection processor is configured to perform operations comprising issuing an antenna selection command to the antenna selection switch using the at least one signal characteristic; and the antenna selection switch is configured to perform operations comprising selecting in response to the antenna selection command the at least one antenna.

3. The circuit of claim 2, wherein the at least one signal characteristic is selected from the group consisting of a signal power density, a signal quality, a data rate, a signal polarization, and a signal amplitude.

4. The circuit of claim 1, wherein each of the plurality of antennas is independently configured.

5. The circuit of claim 2, wherein the antenna selection processor is configured to perform operations comprising:
receiving at least one antenna characteristic;
selecting the least one antenna using the at least one antenna characteristic; and
issuing an antenna selection command to the antenna selection switch.

6. The circuit of claim 5, wherein the at least one antenna characteristic is selected from the group consisting of a spatial transmission pattern, a polarization, a gain measure, a bandwidth, a data rate, an impedance measure, and a pointing direction.

7. The circuit of claim 1, wherein the weight functions of the plurality of antennas are pre-determined.

8. The circuit of claim 1 further, wherein,
the port signal analyzer is configured to further perform operations comprising issuing a receive command signal to the signal switch to connect the input port to a receive path when the power measurement is less than or equal to the threshold, and
the receive path comprises a receive signal processor configured to perform operations comprising:
receiving a signal in the shifted signal band from the at least one antenna;
shifting the received signal to the native radio frequency band of the external transceiver; and
sending the shifted received signal via the signal switch and the input port to the external transceiver.

9. A mode shifter connectable to an external radio frequency (RF) transceiver for frequency band conversion, the mode shifter comprising:
L mode shifter modules each comprising a port signal analyzer, a signal switch, a transmit signal processor and an antenna selection processor, wherein L is equal to or greater than 2; and
L input ports, wherein each of the L input ports is electrically connected to one of the L mode shifter modules and configured to receive a radio frequency (RF) signal from any of one or more antenna ports of the external radio frequency (RF) transceiver, and wherein for each of the L mode shifter modules:
the port signal analyzer is configured to perform operations comprising:
determining whether a power measurement at any of the L input ports exceeds a threshold; and
issuing a transmit command signal to the signal switch to connect the input port to a transmit path when the power measurement exceeds the threshold;
the transmit signal processor configured to perform operations comprising:
shifting the RF signal to a shifted signal band, wherein the shifted signal band is lower or higher that a native radio frequency band of the external transceiver; and
communicating the shifted RF signal to at least one antenna of a plurality of antennas for transmission, wherein the transmit signal processor is included in the transmit path, wherein the plurality of antennas is configured to form a phased array; and
the antenna selection processor configured to perform operations comprising:
determining and assigning a weight function to each of the plurality of antennas.

10. The mode shifter of claim 9, wherein L mode shifter modules each further comprise an antenna selection processor and an antenna selection switch and wherein for each of the L mode shifter modules:
the port signal analyzer is further configured to perform operations comprising:
determining at least one signal characteristic of the RF signal; and
communicating the at least one signal characteristic to the antenna selection processor; and
the antenna selection processor is configured to perform operations comprising issuing an antenna selection command to the antenna selection switch using the at least one signal characteristic; and
the antenna selection switch is configured to perform operations comprising selecting in response to the antenna selection command the at least one antenna.

11. The mode shifter of claim 10, wherein the at least one signal characteristic is selected from the group consisting of a signal power density, a signal quality, a data rate, a signal polarization, and a signal amplitude.

12. The mode shifter of claim 9, wherein each of the plurality of antennas at least one antenna is independently configured.

13. The mode shifter of claim 10, wherein for each of the L mode shifter modules:
the antenna selection processor is configured to perform operations comprising:
receiving at least one antenna characteristic;
selecting the at least one antenna using the at least one antenna characteristic; and
issuing an antenna selection command to an antenna selection switch, and
the antenna selection switch is configured to perform operations comprising selecting in response to the antenna selection command the at least one antenna.

14. The mode shifter of claim 13, wherein the at least one antenna characteristic is selected from the group consisting of a spatial transmission pattern, a polarization, a gain measure, a bandwidth, a data rate, an impedance measure, and a pointing direction.

15. The mode shifter of claim 9, wherein the weight functions of the plurality of antennas are pre-determined.

16. The mode shifter of claim 9, wherein the L mode shifter modules each further comprise a receive signal processor and wherein for each of the L mode shifter modules:
the port signal analyzer is configured to further perform operations comprising issuing a receive command signal to the signal switch to connect the input port to a receive path when the power measurement is less than or equal to the threshold,
the receive path comprises the receive signal processor configured to perform operations comprising:
receiving a signal in the shifted signal band from the at least one antenna;
shifting the received signal to the native radio frequency band of the external transceiver; and
sending the shifted received signal via the signal switch and the input port to the external transceiver.

* * * * *